(12) United States Patent
Murtha et al.

(10) Patent No.: US 8,784,653 B2
(45) Date of Patent: *Jul. 22, 2014

(54) MODULAR SAND FILTRATION-ANCHOR SYSTEM AND WAVE ENERGY WATER DESALINIZATION SYSTEM INCORPORATING THE SAME

(71) Applicant: Murtech, Inc., Glen Burnie, MD (US)

(72) Inventors: Robert Murtha, Stevensville, MD (US); Michael E. McCormick, Annapolis, MD (US); Mark Washington, Middletown, DE (US)

(73) Assignee: Murtech, Inc., Glen Burnie, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/929,171

(22) Filed: Jun. 27, 2013

(65) Prior Publication Data

US 2014/0008306 A1 Jan. 9, 2014

Related U.S. Application Data

(60) Provisional application No. 61/668,213, filed on Jul. 5, 2012.

(51) Int. Cl.
*B01D 61/04* (2006.01)
*B01D 24/04* (2006.01)
*C02F 1/44* (2006.01)
*E02B 9/08* (2006.01)
*F03B 13/20* (2006.01)
*B01D 61/08* (2006.01)
*C02F 1/00* (2006.01)
*E03B 1/02* (2006.01)
*C02F 103/02* (2006.01)

(52) U.S. Cl.
CPC ............ *B01D 61/04* (2013.01); *B01D 24/042* (2013.01); *B01D 61/08* (2013.01); *B01D 2101/04* (2013.01); *B01D 2201/26* (2013.01); *B01D 2311/04* (2013.01); *B01D 2313/243* (2013.01); *C02F 1/004* (2013.01); *C02F 1/441* (2013.01); *C02F 2103/02* (2013.01); *E02B 9/08* (2013.01); *E03B 1/02* (2013.01); *F03B 13/20* (2013.01); *F05B 2220/62* (2013.01); *Y02E 10/38* (2013.01)
USPC ... 210/170.11; 210/259; 210/266; 210/321.6; 210/323.1; 405/76; 405/127; 60/500; 60/505; 60/506; 290/42

(58) Field of Classification Search
CPC .... B01D 24/042; B01D 24/205; B01D 24/24; B01D 35/02; B01D 35/05; B01D 61/04; B01D 61/08; B01D 2101/04; B01D 2201/26; B01D 2311/04; B01D 2313/243; C02F 1/004; C02F 1/441; C02F 2103/02; E02B 9/08; E03B 1/02; E03B 3/00; E03B 3/04; F03B 13/26; F03B 13/14; F03B 13/20; Y02E 10/38
USPC .............. 210/652, 747.11, 747.5, 747.6, 806, 210/807, 122, 162, 170.01, 170.05, 170.09, 210/170.11, 242.1, 259, 263, 266, 321.6, 210/323.1; 405/76, 127; 60/497, 498, 500, 60/505, 506; 290/42
See application file for complete search history.

(56) References Cited

U.S. PATENT DOCUMENTS

| | | | |
|---|---|---|---|
| 260,016 A | 6/1882 | Franklin | |
| 344,813 A * | 7/1886 | Bull | 405/127 |
| 1,078,323 A | 11/1913 | Trull | |
| 1,636,447 A | 7/1927 | Standish | |
| 2,731,799 A | 1/1956 | Lange et al. | |
| 3,022,632 A | 2/1962 | Parks | |
| 3,120,491 A * | 2/1964 | Kincaid | 210/242.1 |
| 3,191,202 A | 6/1965 | Handler | |
| 3,376,588 A | 4/1968 | Berteaux | |
| 3,628,334 A | 12/1971 | Coleman | |
| 3,755,836 A | 9/1973 | Milazzo | |
| 3,818,523 A | 6/1974 | Stillman, Jr. | |
| 3,846,990 A | 11/1974 | Bowley | |
| 3,848,419 A | 11/1974 | Bowley | |
| 4,004,308 A | 1/1977 | Gongwer | |
| 4,048,802 A | 9/1977 | Bowley | |
| 4,077,213 A | 3/1978 | Hagen | |

| | | | |
|---|---|---|---|
| 4,098,084 | A | 7/1978 | Cockerell |
| 4,118,932 | A * | 10/1978 | Sivill .............................. 60/500 |
| 4,209,283 | A | 6/1980 | Marbury |
| 4,210,821 | A | 7/1980 | Cockerell |
| 4,255,066 | A | 3/1981 | Mehlum |
| 4,264,233 | A | 4/1981 | McCambridge |
| 4,280,238 | A | 7/1981 | van Heijst |
| 4,326,840 | A | 4/1982 | Hicks et al. |
| 4,335,576 | A | 6/1982 | Hopfe |
| RE31,111 | E | 12/1982 | Hagen |
| 4,408,454 | A | 10/1983 | Hagen et al. |
| 4,421,461 | A | 12/1983 | Hicks et al. |
| 4,512,886 | A | 4/1985 | Hicks et al. |
| 4,686,377 | A | 8/1987 | Gargos |
| 4,698,969 | A | 10/1987 | Raichlen et al. |
| 4,781,023 | A | 11/1988 | Gordon |
| 4,894,873 | A | 1/1990 | Kiefer et al. |
| 4,954,110 | A | 9/1990 | Warnan |
| 5,112,483 | A * | 5/1992 | Cluff .............................. 210/266 |
| 5,132,550 | A | 7/1992 | McCabe |
| 5,186,822 | A | 2/1993 | Tzong et al. |
| 5,359,229 | A | 10/1994 | Youngblood |
| 5,558,459 | A | 9/1996 | Odenbach et al. |
| 5,879,105 | A | 3/1999 | Bishop et al. |
| 6,406,221 | B1 | 6/2002 | Collier |
| 6,451,204 | B1 * | 9/2002 | Anderson ..................... 210/162 |
| 6,476,511 | B1 | 11/2002 | Yemm et al. |
| 6,647,716 | B2 | 11/2003 | Boyd |
| 6,863,806 | B2 | 3/2005 | Stark et al. |
| 7,023,104 | B2 | 4/2006 | Kobashikawa et al. |
| 7,042,112 | B2 | 5/2006 | Wood |
| 7,245,041 | B1 | 7/2007 | Olson |
| 7,264,420 | B2 | 9/2007 | Chang |
| 7,443,047 | B2 | 10/2008 | Ottersen |
| 7,579,704 | B2 | 8/2009 | Steenstrup et al. |
| 7,658,843 | B2 | 2/2010 | Krock et al. |
| 7,694,513 | B2 | 4/2010 | Steenstrup et al. |
| 7,728,453 | B2 | 6/2010 | Evans |
| 7,900,571 | B2 | 3/2011 | Jaber et al. |
| 8,564,151 | B1 | 10/2013 | Huebner |
| 8,650,869 | B1 | 2/2014 | McCormick |
| 2003/0010691 | A1 * | 1/2003 | Broussard ..................... 210/170 |
| 2003/0121408 | A1 | 7/2003 | Linerode et al. |
| 2006/0112871 | A1 | 6/2006 | Dyhrberg |
| 2006/0283802 | A1 * | 12/2006 | Gordon ........................ 210/747 |
| 2007/0108112 | A1 * | 5/2007 | Jones et al. .............. 210/170.11 |
| 2007/0200353 | A1 | 8/2007 | Ottersen |
| 2009/0084296 | A1 | 4/2009 | McCormick |
| 2010/0054961 | A1 * | 3/2010 | Palecek et al. ................. 417/61 |
| 2010/0320759 | A1 | 12/2010 | Lightfoot et al. |
| 2011/0299927 | A1 | 12/2011 | McCormick et al. |
| 2012/0025532 | A1 | 2/2012 | Song |
| 2012/0067820 | A1 * | 3/2012 | Henthorne et al. ...... 210/170.11 |
| 2013/0008158 | A1 | 1/2013 | Hon |

FOREIGN PATENT DOCUMENTS

| | | |
|---|---|---|
| CA | 1193490 | 9/1985 |
| DE | 2248260 | 4/1974 |
| FR | 2437507 | 4/1980 |
| GB | 2113311 | 8/1983 |
| GB | 2459112 | 10/2009 |
| JP | 2002142498 | 5/2002 |
| KR | 20110020077 | 3/2011 |
| WO | WO 95/10706 | 4/1995 |
| WO | WO 01/96738 | 12/2001 |
| WO | WO 03/026954 | 4/2003 |

OTHER PUBLICATIONS

Long Beach Water Department, Under-Ocean Floor Seawater intake and Discharge Test Plan, Apr. 1, 2009.
Lovo, Robert, "Initial Evaluation of the Subfloor Water Intake Structure System (Swiss) vs. Conventional Multimedia Pretreatment Techniques," Assistance Agreement No. 98-FC-81/0044, Desalination Research and Development Program Report No. 66, U.S. Dept. of Interior, May 2001.
McCormick, "Ocean Wave Energy Conversion," Wiley-Interscience, New York (1981, reprinted by Dover Publication, Long Island, New York in 2007).
WateReuse Association, "Overview of Desalination Plan Intake Alternatives", Mar. 2011.
International Search Report for corresponding PCT Application No. PCT/US2013/048906 dated Sep. 30, 2013.
Bernitsas, et al., "VIVACE (Vortex Induced Vibration for Aquatic Clean Energy): A New Concept in Generation of Clean and Renewable Energy from Fluid Flow," Proceedings of OMAE2006, Paper OMAE06-92645, Hamburg, Germany Jun. 4-9, 2006, pp. 1-18.
Blevins, Robert D., "Flow-Induced Vibrations," Van Nostrand Reinhold, New York, 1990, pp. 194-213.
Budar, et al., "A Resonant Point Absorber of Ocean-Wave Power," Nature, vol. 256, Aug. 1975, pp. 478-480.
Cébron, et al., "Vortex-Induced Vibrations Using Wake Oscillator Model Comparison on 2D Response with Experiments," Institute of Thermomechanics, Prague, 2008.
Falnes, Johannes, "Ocean Waves Oscillating Systems," Cambridge University Press, pp. 196-224, 2002.
Farshidianfar, et al., "The Lock-in Phenomenon in VIV Using a Modified Wake Oscillator Model for Both High and Low Mass-Damping Ratio," Iranian Journal of Mechanical Engineering, vol. 10, No. 2, Sep. 2009.
Garnaud, et al, "Comparison of Wave Power Extraction by a Compact Array of Small Buoys and by a Large Buoy," Proceedings of the 8th European Wave and Tidal Energy Conference, Uppsala, Sweden, 2009, pp. 934-942.
Jauvitis, et al., The Effect of Two Degrees of Freedom on Vortex-Induced Vibration at Low Mass and Damping,: J. Fluid Mechanics, vol. 509, 2004, pp. 23-62.
Lee, et al., "On the Floating Breakwater-A New Arrangement," Proceedings, International Conf. on Coastal Engineering, Taipei, 1986, pp. 2017-2022.
Leong, et al., "Two-Degree-of-Freedom Vortex-Induced Vibration of a Pivoted Cylinder Below Critical Mass Ratio," Proceedings of the Royal Society A, vol. 464, 2008, pp. 2907-2927.
Liang, et al., "A Study of Spar Buoy Floating Breakwater," Ocean Engineering, vol. 31, 2004, pp. 43-60.
McCormick, et al., "Full-Scale Experimental Study of Bi-Modal Buoy," Report EW 01-11, Department of Naval Architecture and Ocean Engineering, U.S. Naval Academy, Jun. 2011, 32 pages.
McCormick, et al., "Planing Characteristics of Fast-Water Buoys," Journal of the Waterways Harbors and Coastal and Engineering Division, vol. 99, No. WW4, Nov. 1973, pp. 485-493.
McCormick, et al., "Prototype Study of a Passive Wave-Energy Attenuating Bi-Modal Buoy," Murtech, Inc. Report M-12-1, Jan. 2012, 26 pages.
Miles, John W., "On the Interference Factors for Finned Bodies," J. Aeronautical Sciences, vol. 19, No. 4, Apr. 1952, p. 287.
Murali, et al., "Performance of Cage Floating Breakwater," Journal of Waterway, Port, Costal and Ocean Engineering, Jul./Aug. 1997, pp. 1-8.
Ng, et al., "An Examination of Wake Oscillator Models for Vortex-Induced Vibrations," Naval Undersea Warfare Center Division, Newport, RI, Technical Report 11,298, Aug. 1, 2011, 18 pages.
Ogink, et al., "A Wake Oscillator With Frequency Dependent Coupling for the Modeling of Vortex-Induced Vibration," Journal of Sound and Vibration, No. 329, 2010, pp. 5452-5473.
Rodenbusch, George, "Response of a Pendulum Spar to 2-Dimensional Random Waves and a Uniform Current," Massachusetts Institute of Technology and Woods Hole Oceanographic Institution, Engineering Program, Ph.D. Dissertation, Aug. 1978, 138 pages.
Ryan, et. al., "Energy Transfer in a Vortex Induced Vibrating Tethered Cylinder System", Conf. on Bluff Body Wakes and Vortex-Induced Vibrations, Port Douglas, Australia, Dec. 2002, 4 pages.
Shiguemoto, et al., "Vortex Induced Motions of Subsurface Buoy with a Vertical Riser: A Comparison Between Two Phenomenological Models" Proceedings, 23° Congresso Nacional de Transporte Aquaviário, Construção Naval e Offshore, Rio de Janeiro, Oct. 25-29, 2010, pp. 1-9.

(56) References Cited

OTHER PUBLICATIONS

Sobey, et al., "Hydrodynamic of Circular Piles," Proceedings, 6th Australian Hydraulics and Fluid Mechanics Conference, Adelaide, Dec. 1977, pp. 253-256.
International Search Report for related PCT Application No. PCT/US2013/059175 dated Mar. 19, 2014.

\* cited by examiner

*Primary Examiner* — Christopher Upton
(74) *Attorney, Agent, or Firm* — Caesar, Rivise, Bernstein, Cohen & Pokotilow, Ltd.

(57) ABSTRACT

A filter-anchor for placement on a sea floor is provided. It includes a filter housing for filtering sea water prior to entry into a water desalinization system. The filter housing has an exterior, an interior chamber, at least one inlet for providing the sea water to the interior chamber, and at least one outlet for enabling filtered water to be pumped from the interior chamber. A sand filter is disposed in the filter housing. The filter housing has at least one water conduction outlet conduit for filtered water to be pumped to the desalinization system. A wave energy conversion system utilizing the filter anchor is also provided to effect the pumping of the filtered water to the desalinization system. A method of anchoring a wave energy conversion system and providing filtered water to a desalinization system is also provided.

14 Claims, 5 Drawing Sheets

MODULAR SAND FILTRATION-ANCHOR SYSTEM AND WAVE ENERGY WATER DESALINIZATION SYSTEM INCORPORATING THE SAME

CROSS-REFERENCE TO RELATED APPLICATION

This application claims priority to U.S. Provisional Application No. 61/668,213, entitled Modular Sand Filtration-Anchor System, filed Jul. 5, 2012, pending.

BACKGROUND OF THE INVENTION

The present invention is generally directed to the generation of potable water. More particularly, the present invention is directed to articulated wave energy conversion system (AWECS) with reverse osmosis (RO) membranes to generate potable water.

Desalinization plants are located around the world, and are operated using electricity to pressurize the incoming source water. Depending on the location, there may be pretreatment requirements to optimize the influent for processing through the RO membranes.

The U.S. Department of Interior (DOI) funded the Subfloor Water Intake Structure System (SWISS), currently utilized in desalination desalinization plants in California and Japan. The SWISS approach is to install a permanent subfloor well/intake system for the source-water for the traditional shore structures. The in-situ sand provides the filtration media. See, for example, Lovo, Robert, "Initial Evaluation of the Subfloor Water Intake Structure System (SWISS) vs. Conventional Multimedia Pretreatment Techniques," Assistance Agreement No. 98-FC-81-0044, Desalination Research and Development Program Report No. 66, U.S. Dept. of Interior, May 2001, whose disclosure is incorporated by reference herein in its entirety.

Ocean wave-energy conversion is directed to the exploitation of ocean wave energy to produce energy in one or more of four forms, those being hydraulic, pneumatic, mechanical or electrical. See McCormick, "Ocean Wave Energy Conversion," published by Wiley-Interscience, New York (1981, reprinted by Dover Publication, Long Island, N.Y. in 2007). The articulated-barge wave-energy conversion system dates back to the 1970's when both Sir Christopher in the United Kingdom and Glen Hagen of the United States suggested the system. The system was studied in the late 1970's by P. Haren (1978) at MIT. He found that the optimum articulated-barge configuration was a three-barge system. In the 1980's, Dr. Peter McCabe showed that the efficiency of the three-barge system could be substantially improved by suspending an inertial-damping plate below the center barge. Dr. McCabe, then, produced a prototype of the system, coined the McCabe Wave Pump (MWP), which was deployed and studied in the Shannon Estuary for approximately nine years. See, U.S. Pat. No. 5,132,550 (McCabe). The MWP was primarily designed as a producer of potable water.

Ocean Energy Systems (OES) is in the business of designing and manufacturing articulated-barge systems to produce potable water by RO desalinization of sea water. U.S. Patent Publication No. 2009/0084296 (McCormick), describes a system directed to a wave-powered device having enhanced motion making use of an AWECS. See also U.S. Patent Publication No. 2010/0320759 (Lightfoot, et al.). The AWECS basically comprises a forward barge, a rear barge and an intermediate or center barge, all of which arranged to float on a body of water having waves. The barges are hingedly coupled together so that they can articulate with respect to each other in response to wave motion. The AWECS also includes high-pressure pumps which straddle and pivotably connect the barge-pairs, e.g., at least one pump connects the forward barge and the intermediate barge, and at least another pump connects the rear barge and the intermediate barge. The pumps are designed to draw in the water through a pre-filter, pressurize the water, and deliver the water to an on-board RO desalinization system. That system includes an RO membrane. As an incoming wave makes contact with the forward barge first, the hydraulic fluid in the pump(s) coupled between the forward barge and the center barge are driven in a first direction; as the wave continues, the hydraulic fluid in the pump(s) coupled between the rear barge and the center barge are driven in a second opposite direction. The end results are bi-directional hydraulic pumps.

In U.S. Provisional Patent Application Ser. No. 61/707,206, filed on Sep. 28, 2012, there is disclosed an AWECS arranged for producing electrical energy from the wave energy. To that end, it makes use of an AWECS similar to that described above, except that it also makes use of a commercially-available rotary-vane pump to drive a generator to produce the electricity. In particular, the invention of that Provisional Application entails a floating device having a first portion (e.g., a first barge) movably coupled (e.g., hinged) to a second portion (e.g., a second barge); at least one hydraulic or pneumatic pump (e.g., a linear pump) coupled between the first portion the said second portion, the hydraulic pump driving a hydraulic fluid therein when the first portion moves with respect to the second portion due to wave energy. A fluid rectifier is provided in the AWECS and is in fluid communication with the at least one hydraulic or pneumatic pump, that generates a unidirectional hydraulic or pneumatic fluid flow. A rotary vane pump is coupled to the fluid rectifier. The rotary vane pump uses the unidirectional flow to generate a rotational motion via a drive member. A rotating electrical generator (e.g., a DC generator) is coupled to that drive member, so that the drive member causes the rotating electrical generator to generate electricity when the drive member is rotating.

BRIEF SUMMARY OF THE INVENTION

A filter-anchor is provided that includes a filter housing for filtering sea water prior to entry into a water desalinization system for placement on a sea floor. The filter housing has an exterior, an interior chamber, at least one inlet for providing the sea water to the interior chamber, and at least one outlet for providing filtered water to exit the interior chamber. A sand filter is disposed in the filter-housing, separating the exterior from the interior chamber. The filter housing has at least one water conduction outlet conduit for allow filtered water to exit the interior chamber to provide filtered water.

The inlets for providing sea water may provide for a surface intake velocity of less than 0.5 feet per second to restrict incursion of fish larva and macro or micro vertebrae. The filter-anchor may be of a size to permit container transportable via truck transportation. The interior chamber of the filter anchor may be substantially filled with clean, washed, coarse sand, from either a local beach or shoreline source or from sand obtained from a commercial sand source. The filter housing may have hatches between the exterior and the interior chamber which, when opened, provide for submersion of the filter housing via flooding of the interior chamber and controlled sinking of the filter-anchor to the sea floor. The filter-anchor, prior to use as a filter, may be floatable and towable to a deployment site in the sea. At least one submersible pump and submersible air snorkel may be included such that the filter-anchor is re-floatable when the hatches are in a closed position, wherein the interior chamber is substantially filled with air, wherein the submersible pump and air snorkel are activatable to float the filter-anchor.

A wave energy conversion system is also provided that includes an articulated barge system for converting wave energy into energy used to pump water to a desalination desalinization system to generate potable water. At least one filter-anchor is also included. Each filter-anchor includes a filter housing and a filter disposed therein for filtering sea water prior to entry into a water desalination system for placement on a sea floor. The filter housing has an exterior, an interior chamber, at least one inlet for providing the sea water to the interior chamber, and at least one outlet for providing filtered water to exit the interior chamber. The filter is disposed in the filter-housing, separating the exterior from the interior chamber. The filter housing has at least one water conduction outlet conduit providing for filtered water to exit the interior chamber to provide filtered water to the desalinization system on the articulated barge. A mooring buoy is attached to each filter-anchor by a mooring line.

The desalinization system may include a reverse osmosis membrane. The filter may be a sand filter. The filter-anchor may include at least one feed line in the interior chamber to provide the filtered water to the water conduction outlet conduit. The filter housing may be constructed from steel sheet. The at least inlet may be a manually controlled hatch or an automatically controlled hatch.

A method of anchoring a wave energy conversion system and providing filtered water to a desalination system is also provided. The method includes towing an articulated barge for converting wave energy into energy used to pump water to generate potable water to a location in a sea and towing at least one filter-anchor to the location and sinking all of the at least one filter-anchors to the sea bed. Each filter-anchor includes a filter housing and a filter disposed therein for filtering sea water prior to entry into a water desalinization system for placement on a sea floor. The filter housing has an exterior, an interior chamber, at least one inlet for providing the sea water to the interior chamber, and at least one outlet for providing filtered water to exit the interior chamber. The filter is disposed in the filter-housing, separating the exterior from the interior chamber, the filter housing has at least one water conduction outlet conduit for filtered water to exit the interior chamber to provide filtered water to the desalination system on the articulated barge. The method also includes the steps of providing a mooring buoy for each filter-anchor at the location, attaching each mooring buoy to one of the filter-anchors by a mooring line, attaching each filter-anchor to the articulated barge system, and supplying filtered water to the articulated barge system.

The desalinization system may use a reverse osmosis membrane. The method may include the step of intaking sea water having an intake velocity of less than 0.5 feet per second to restrict incursion of fish larva and macro or micro vertebrae. The method may include the step of transporting the filter-anchor via a highway. The method may include opening a plurality of filter hatches located between the exterior and the interior chamber to submerse of the filter housing via flooding of the interior chamber and controlled sinking of the filter-anchor to the sea floor. The step of towing the filter-anchor to a deployment site in the sea may be included.

The steps of closing the hatches and activating at least one submersible pump and submersible air snorkel to fill the filter anchor with air, to re-float the filter anchor may be included.

BRIEF DESCRIPTION OF SEVERAL VIEWS OF THE DRAWINGS

The invention will be described in conjunction with the following drawings in which like reference numerals designate like elements and wherein.

DETAILED DESCRIPTION OF THE INVENTION

The present invention is directed to a portable filtration-anchor system for filtering salt water prior to its entry into a reverse osmosis desalinization system that will float to the site, and then be sunk into place. A filter-anchor acts as a filter for providing filtered water to an articulated wave energy conversion system (AWECS) as well as one or more of the anchoring points for the system for providing potable water.

The invention will be illustrated in more detail with reference to the following embodiments, but it should be understood that the present invention is not deemed to be limited thereto.

Figure 1:
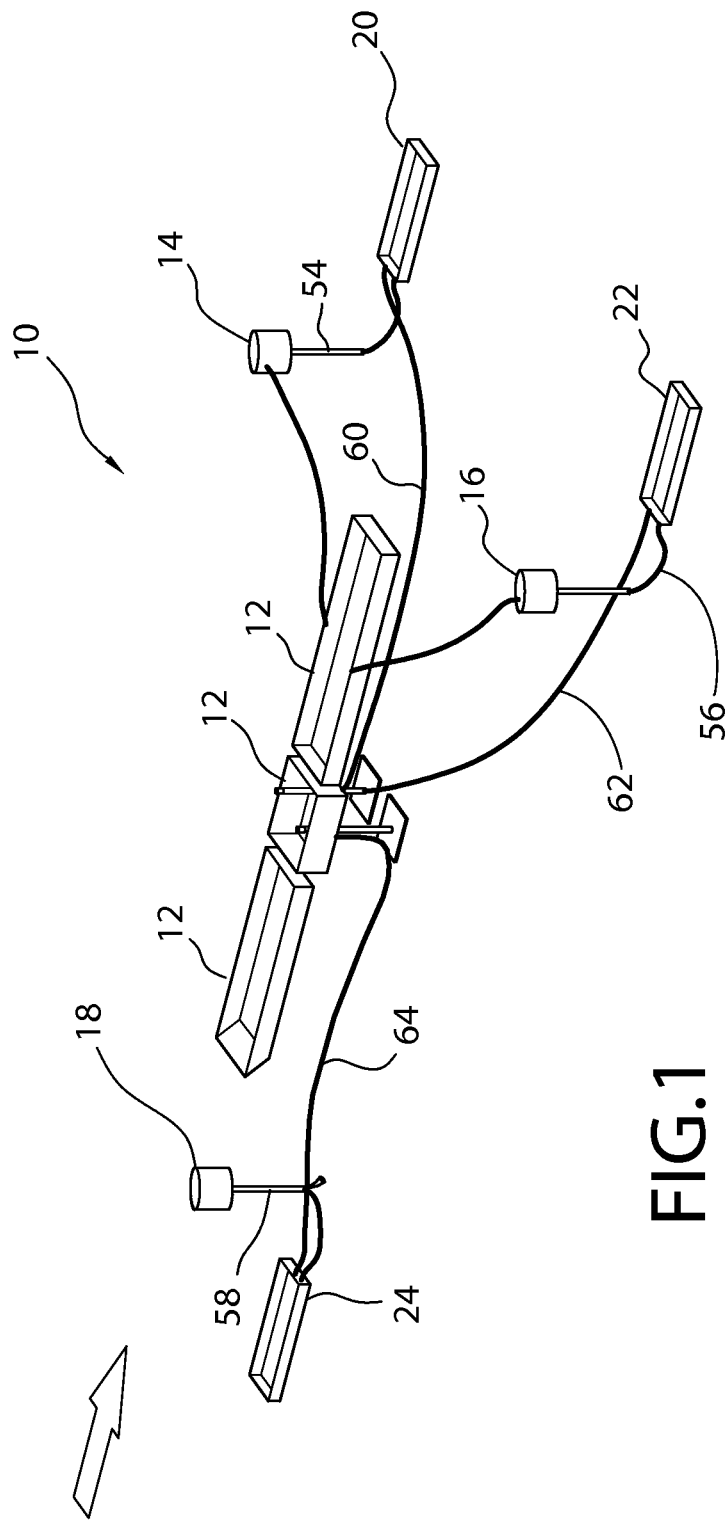
FIG. 1 is a simplified schematic diagram of an articulated wave energy conversion system utilizing the modular sand filtration-anchoring system in accordance with an exemplary embodiment of the present invention.

Referring now to the figures, wherein like part numbers refer to like elements throughout the several views, there is shown in FIG. 1 an AWECS 10 in accordance with an exemplary embodiment of the present invention. The AWECS 10 includes articulated barges 12 that are anchored using, for example, a 3-point anchoring system utilizing mooring buoys 14, 16, 18 having filter-anchor units 20, 22, 24. The filter-anchor units 20, 22, 24 double as intakes for the articulated barges 12, allowing seawater to be pre-filtered prior to entering designated barges 12 with negligible effects on aquatic life. This system is, for example, a containerized version of the SWISS (as discussed in the Background, above).

The seawater will be pressurized and processed through an onboard reverse osmosis system. For the design sea (for example, a 1.5-meter significant wave height and 7-second period), an average of 100,000 gallons per day (gpd) of product (potable) water may be expected. This value is based on 200,000 gpd of source water taken in through the sand filtration system. However, it is intended that the AWECS 10 will operate in greater and lesser seas, wherein the potable-water production will vary with the sea conditions.

The filter-anchor units 20, 22, 24 are preferably built to be transportable via over-the-road trucking (as are all of the AWECS components).

Figure 2:
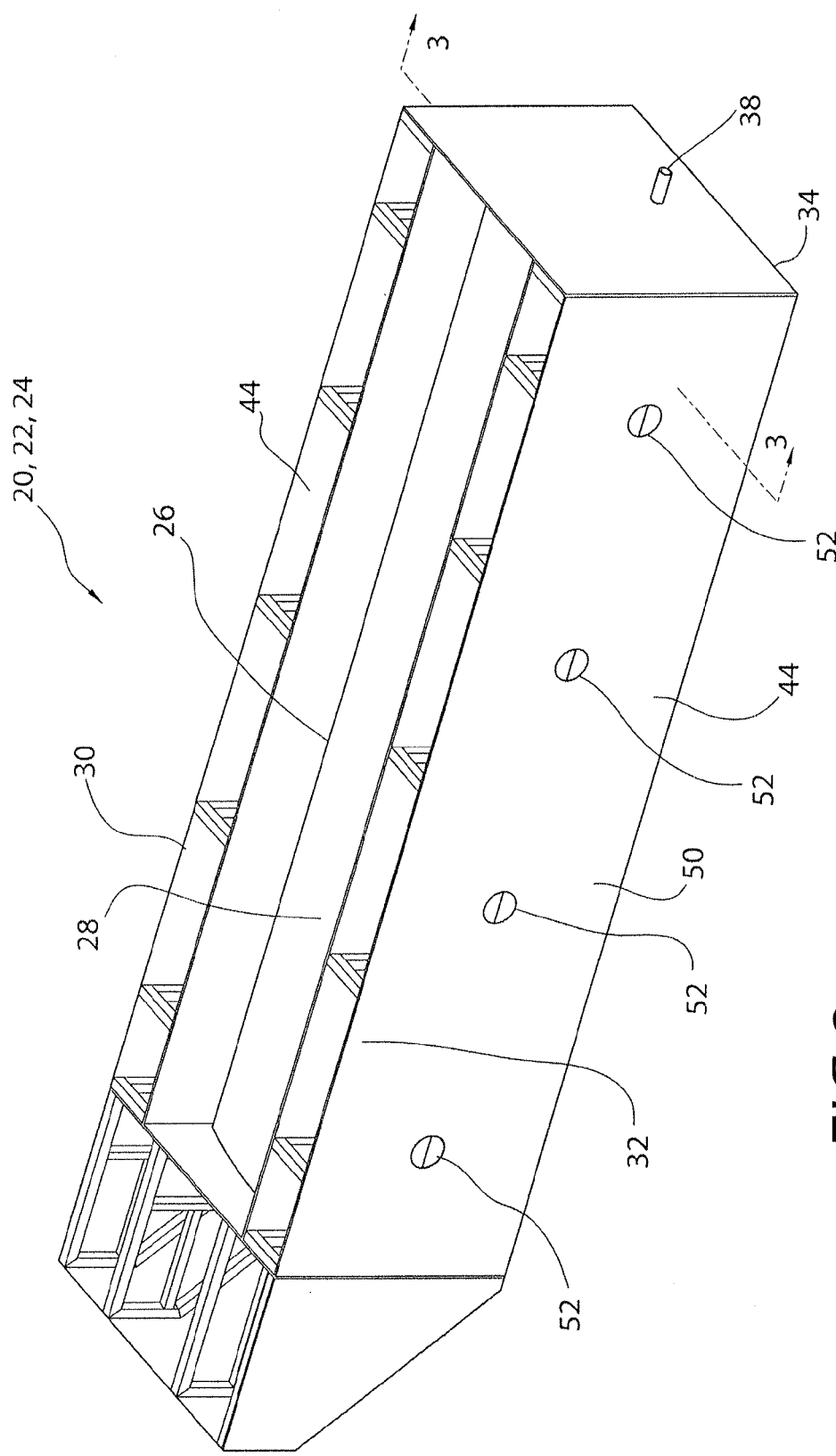
FIG. 2 is an isometric view of the modular sand filtration-anchoring system of FIG. 1.
Figure 3:
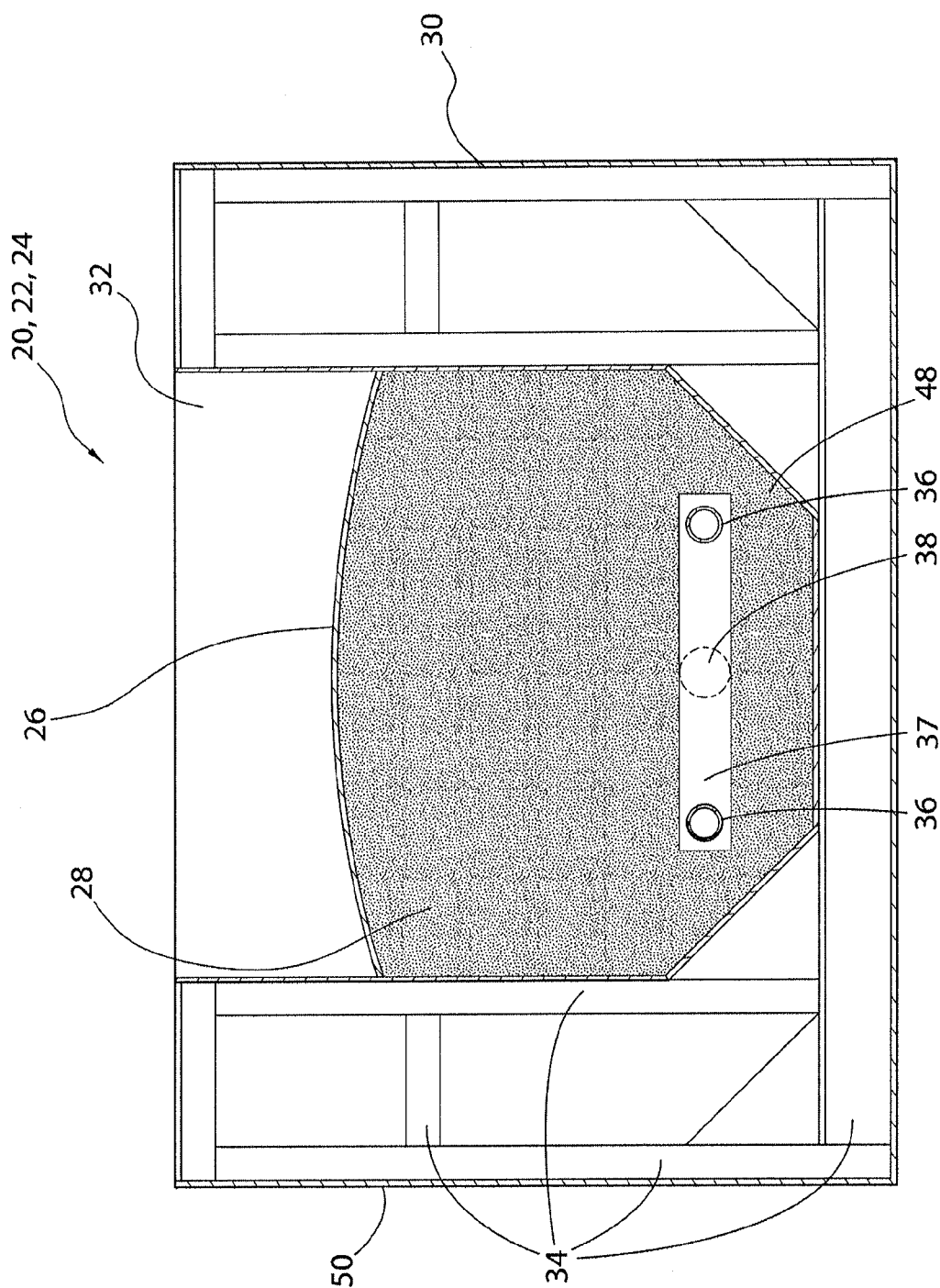
FIG. 3 is a front cross-section view of the modular sand filtration-anchoring system of FIG. 1.
Figure 4:
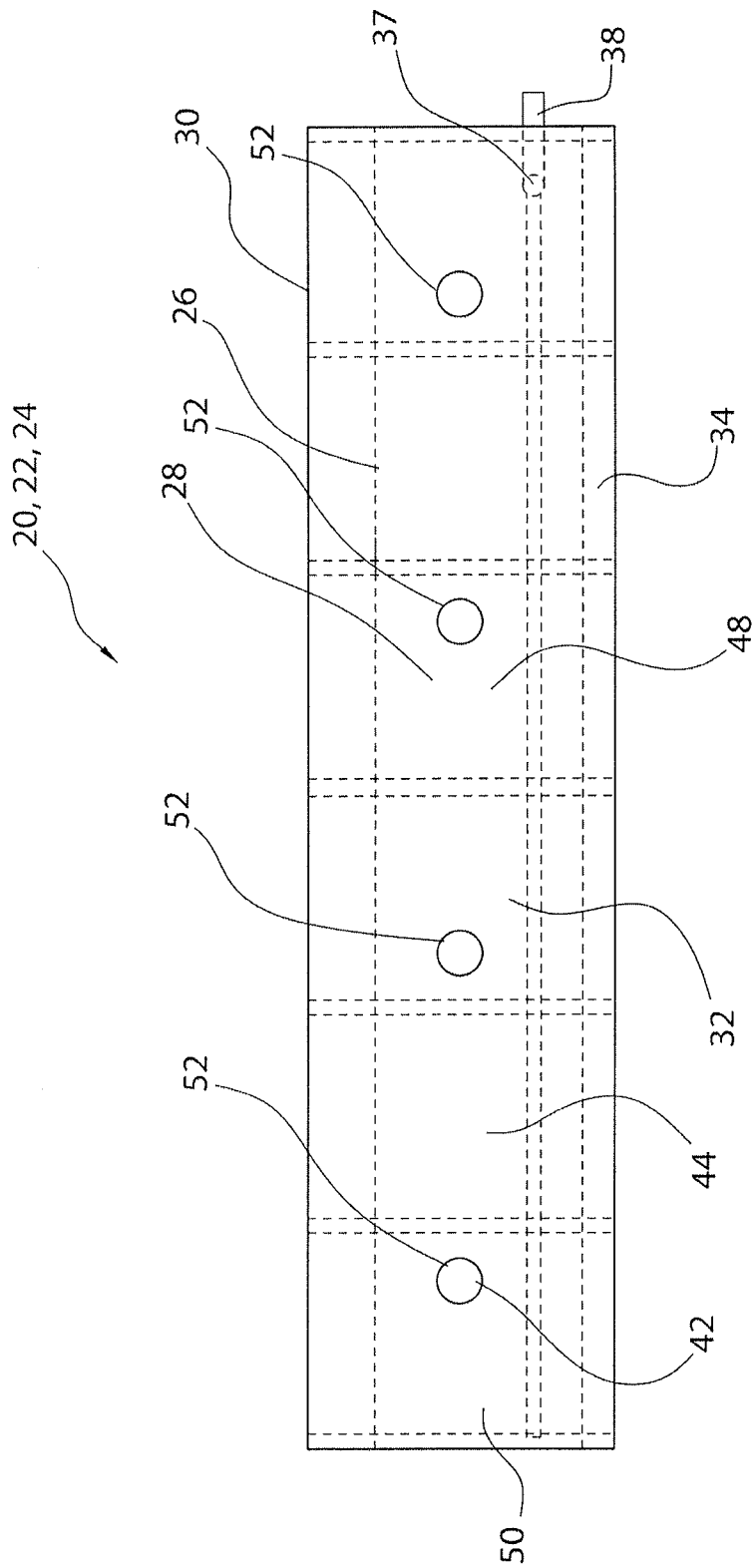
FIG. 4 is a side elevation view of the modular sand filtration-anchoring system of FIG. 1.
Figure 5:
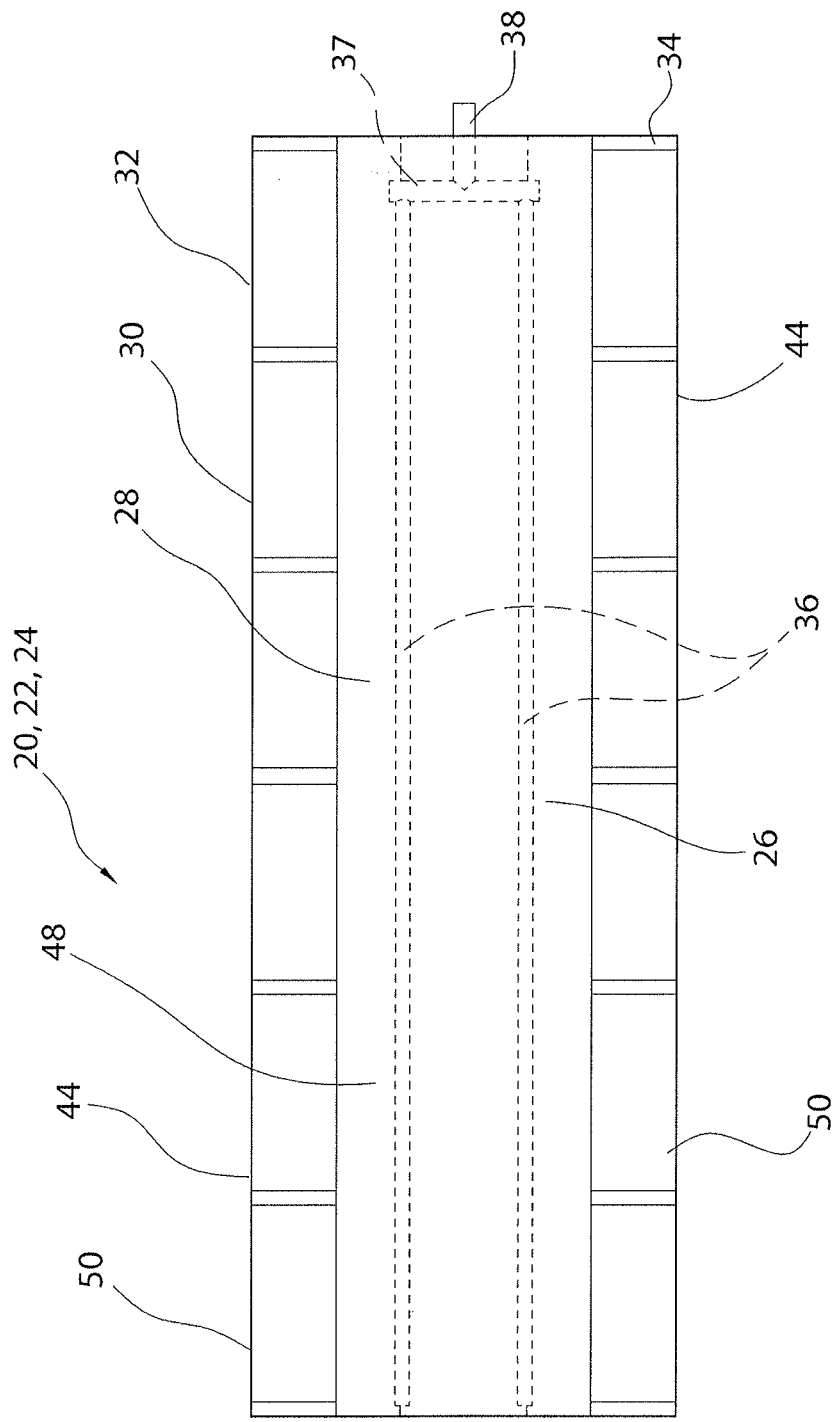
FIG. 5 is a top, plan view of the modular sand filtration-anchoring system of FIG. 1.

As can be seen in FIGS. 2 and 3, the small barge-like filter-anchors 20, 22, 24 will be lined with a fabric such as a woven geotextile bag 26 (such as Geotube® brand permeable fabric) filled with sand 28. The permeability of the geotextile is in gallons per square feet. It will not be the restricting permeability of the system.

The sand 28 to be used in the filter-anchors 20, 22, 24 is preferably coarse washed sand placed into the geotextile bag 26. The estimated coefficient of permeability (K) of the sand is expected to be between 0.003 and 0.00003 ft/s. Any combination of engineered sand and gravel may be used to obtain best filtering results It is anticipated that (for example) 200,000 gpd of supply water will be pulled through the three filter-anchors 20, 22, 24 in the present example. In this exemplary embodiment, the surface area for a single filter may be 30'×6' or 180 square feet. For three such filter-anchors 20, 22, 24, the surface area would be approximately 540 square feet. At a rate of 0.003 fps, all three units would allow 1.62 cubic feet/second or 12.1 gallons/second. This translates to 726 gallons per minute or 1,045,440 gallons per day. Each modular filter-anchor 20, 22, 24 is estimated to handle approximately 348,480 gallons/day, depending on the sea state.

As stated above, the AWECS 10 is designed to be deployed in a sea having, for example, a 1.5-meter significant wave height and seven-second period. However, the AWECS 10 will operate in greater and lesser seas, and the potable-water production will vary with the sea conditions.

As can be seen in FIGS. 2-5, each filter-anchor 20, 22, 24 includes a modular filter housing 30 having an exterior 50 and an interior chamber 48. The woven geotextile bag 26 with the sand 28 is disposed within the interior chamber 48. The interior chamber 48 need not be sealed. The housing 50 includes at least one inlet 52 for providing sea water to the interior chamber 48, and at least one water conduction outlet conduit 38 for enabling the filtered water to exit i.e., be pumped out) the interior chamber 48.

The filter-anchor 20 includes at least one feed line 36 located in the interior chamber 48 to provide the filtered water to the water conduction outlet conduit 48. The feed lines 36 are perforated or otherwise allow for the water filtered by the sand in chamber 38 water to enter the lines 36. The feed lines 36 can be V-line well piping. Only water that passes through the filter (e.g., the geotextile bag 26) may enter the feed lines 36.

The modular filter housing 30 may be constructed from steel sheet 32. The at least one inlet 52 may be apertures in the side of the filter housing 30 and may have manually or automatically controlled hatches to control water flow.

The modular filter housing 30 is a barge-like structure that can be floated into place. That is, the modular filter housing 30 will, first, be able to barge the sand 30 in the geotextile bag 26 to the site where it will be used to make potable water. The sheet steel 32 will be used for the skin, for example, approximately ⅜ inch thick. There will be various beam members 34 either I-beams or channel beams. The modular filter housing 30 will preferably be protected from electrolysis using sacrificial zinc anodic protection. It may also be painted to reduce the surface corrosion, as determined necessary.

Another possible material for the filter housing 30 may be concrete.

The geotextile bag 26 may be, for example, polyethylene, woven fabric. Seam strength may be, for example, approximately 450 pounds per inch pull. The bag 26 is designed to keep the sand 28 from washing from the submerged filter structure.

The feed lines 36 may be constructed of, for example, high density polyethylene, and may be encased in filter fabric and stone sleeve, to prevent sand 28 from being pulled into the feed lines 36.

The feed lines 36 transport filtered water through a manifold 37 to preferably, a single water conduction outlet conduit 38 that is, for example, six inches in diameter. The water conduction conduit 38 penetrates the filter housing 30 and is the source for water lines 60, 62, 64 (see FIG. 1) extending to the AWECS pumps (not shown, but integral to the articulated barge 12). For example, two four-inch feed lines 36 connect to the six-inch water conduction outlet conduit 38. The operation of the AWECS pumps pulls the filtered sea water from the chamber 48 to the RO membrane in the AWECS. The power for operating the pumps is provided by the wave energy captured by the articulating barges 12.

As can be seen in schematically in FIG. 2, the filter housing 30 may have manually-operated scuttles or hatches at the inlets 52 in the sides 44 of the housing to allow for flooding of the entire filter housing 30. The number of hatches will be sufficient to allow for a controlled submersion and re-flotation of the unit. The re-flotation will be done by, first, attaching a snorkel (not shown) through the free-surface of the water and, then, using a submerged pump knot shown) to de-water the filter system. Air is drawn in through the snorkel to replace the purged water in the bilge and gunnel areas of the modular filter-anchors 20, 22, 24. The filter housing 30 may be capped and made water tight prior to re-float to allow removal of as much water as possible from this area tee to provide the additional buoyancy required for re-float.

A method of anchoring a wave energy conversion system 10 and providing filtered water to the system is also provided. The method includes the steps of towing an articulated barge 12 for converting wave energy into energy used to pump water to an RO membrane to generate potable water to a location in an ocean, towing at least one filter-anchor 20, 22, 24 (as described above) to the location and sinking each filter-anchor to the ocean bed. That action is accomplished by filling the interior chamber of the filter housing with water. A mooring buoy 14, 16, 18 is provided for each filter-anchor 20, 22, 24 at their respective locations. The mooring buoys 14, 16, 18 are attached to respective ones of the filter-anchors 20, 22, 24 by respective mooring lines 54, 56, 58. The filter anchors 20, 22, 24 are attached to the articulated barges 12. Source water to the RO membrane is then provided from the filter-anchors via the water lines 60, 62 and 64 by the operation of the AWECS pumps.

While the invention has been described in detail and with reference to specific embodiments thereof, it will be apparent to one skilled in the art that various changes and modifications can be made therein without departing from the spirit and scope thereof.

What is claimed is:

1. A filter-anchor, comprising:
   (a) a filter housing for filtering sea water prior to entry into a wave powered water desalination system for placement on a sea floor, the filter housing having an exterior, an interior chamber, at least one inlet for providing the sea water to the interior chamber, and at least one outlet for providing filtered water to exit the interior chamber, said filter housing comprising a barge structure that permits said filter housing to be towed to a sea water location;
   (b) a sand filter disposed in the filter-housing, separating the exterior from the interior chamber, the filter housing having at least one water conduction outlet conduit for filtered water to exit the interior chamber to provide filtered water.

2. The filter-anchor of claim 1, wherein the area of the at least one inlet for providing sea water provides a surface intake velocity of less than 0.5 feet per second to restrict incursion of fish larva and macro or micro vertebrae.

3. The filter-anchor of claim 1, wherein the filter-anchor is of a size to permit container transportable via truck transportation.

4. The filter-anchor of claim 1, wherein the interior chamber of the filter anchor is substantially filled with clean, washed, coarse sand, from either a local beach or shoreline source.

5. The filter-anchor of claim 1, wherein the interior chamber of the filter anchor is substantially filled with clean, washed, coarse sand, obtained from a commercial sand source.

6. The filter-anchor of claim 1, wherein the filter housing has hatches between the exterior and the interior chamber which, when opened, provide for submersion of the filter housing via flooding of the interior chamber and controlled sinking of the filter-anchor to the sea floor.

7. The filter-anchor of claim 6, including at least one submersible pump and submersible air snorkel, wherein the filter-anchor is re-floatable, wherein the hatches are in a closed position, wherein the interior chamber is substantially filled with air, wherein the submersible pump and air snorkel are activatable to float the filter-anchor.

8. A wave energy conversion system comprising:
   (a) an articulated barge system for converting wave energy into energy used to pump water to a wave powered desalination system to generate potable water;
   (b) at least one filter-anchor, each filter-anchor comprising:
      (i) a filter housing for filtering sea water prior to entry into the wave powered water desalination system for placement on a sea floor, the filter housing having an exterior, an interior chamber, at least one inlet for providing the sea water to the interior chamber, and at least one outlet for providing filtered water to exit the interior chamber, said filter housing comprising a barge structure that permits said filter housing to be towed to a sea water location;
      (ii) a filter disposed in the filter-housing, separating the exterior from the interior chamber, the filter housing having at least one water conduction outlet conduit for filtered water to exit the interior chamber to provide filtered water to the desalination system on the articulated barge; and
   (c) a mooring buoy attached to each filter-anchor by a mooring line.

9. The wave energy conversion system of claim 8, wherein the wave powered desalination system includes a reverse osmosis membrane.

10. The wave energy conversion system of claim 8, wherein the filter is a sand filter.

11. The wave energy conversion system of claim 8, wherein the filter-anchor includes at least one feed line in the interior chamber to provide the filtered water to the water conduction outlet conduit.

12. The wave energy conversion system of claim 8, wherein the filter housing is constructed from steel sheet.

13. The wave energy conversion system of claim 8, wherein the at least inlet is a manually controlled hatch.

14. The wave energy conversion system of claim 8, wherein the at least inlet is an automatically controlled hatch.

* * * * *